(12) United States Patent
Wallaker

(10) Patent No.: US 8,206,157 B2
(45) Date of Patent: Jun. 26, 2012

(54) INSTRUMENT FOR USE IN A MEDICAL SIMULATOR

(75) Inventor: Daniel Wallaker, Essex (GB)

(73) Assignee: Keymed (Medical & Industrial Equipment) Limited, Essex (GB)

( * ) Notice: Subject to any disclaimer, the term of this patent is extended or adjusted under 35 U.S.C. 154(b) by 1626 days.

(21) Appl. No.: 11/230,763

(22) Filed: Sep. 21, 2005

(65) Prior Publication Data

US 2006/0069384 A1 Mar. 30, 2006

(30) Foreign Application Priority Data

Sep. 21, 2004 (GB) .................................. 0420977.1

(51) Int. Cl.
G09B 23/28 (2006.01)

(52) U.S. Cl. .............................. 434/262; 600/101; 901/2

(58) Field of Classification Search ................. 606/108; 434/262, 234, 379, 384; 600/184, 101, 104, 600/106; 414/909; 901/2, 3, 19, 34, 32; 74/490.12

See application file for complete search history.

(56) References Cited

U.S. PATENT DOCUMENTS

| | | | | |
|---|---|---|---|---|
| 5,149,270 A * | 9/1992 | McKeown | | 434/262 |
| 5,403,191 A * | 4/1995 | Tuason | | 434/262 |
| 5,623,582 A * | 4/1997 | Rosenberg | | 700/264 |
| 5,704,791 A * | 1/1998 | Gillio | | 434/262 |
| 5,722,836 A * | 3/1998 | Younker | | 434/272 |
| 5,758,814 A * | 6/1998 | Gallagher et al. | | 623/23.72 |
| 5,766,016 A * | 6/1998 | Sinclair et al. | | 434/262 |
| 5,767,839 A * | 6/1998 | Rosenberg | | 345/161 |
| 5,800,177 A * | 9/1998 | Gillio | | 434/262 |
| 5,808,665 A * | 9/1998 | Green | | 348/65 |
| 5,873,732 A * | 2/1999 | Hasson | | 434/262 |
| 5,882,206 A * | 3/1999 | Gillio | | 434/262 |
| 6,037,927 A * | 3/2000 | Rosenberg | | 345/156 |
| 6,062,865 A * | 5/2000 | Bailey | | 434/262 |
| 6,113,395 A * | 9/2000 | Hon | | 434/262 |
| 6,210,398 B1 * | 4/2001 | Ouchi | | 606/1 |
| 6,377,011 B1 * | 4/2002 | Ben-Ur | | 318/566 |
| 6,470,302 B1 * | 10/2002 | Cunningham et al. | | 703/7 |
| 6,706,050 B1 * | 3/2004 | Giannadakis | | 606/185 |
| 6,965,370 B2 * | 11/2005 | Gregorio et al. | | 345/156 |
| 7,056,123 B2 * | 6/2006 | Gregorio et al. | | 434/272 |
| 7,308,831 B2 * | 12/2007 | Cunningham et al. | | 73/841 |
| 2001/0016804 A1 * | 8/2001 | Cunningham et al. | | 703/7 |
| 2004/0045561 A1 * | 3/2004 | Alexander et al. | | 128/897 |
| 2004/0048230 A1 * | 3/2004 | Alexander et al. | | 434/262 |
| 2004/0076940 A1 * | 4/2004 | Alexander et al. | | 434/262 |

(Continued)

FOREIGN PATENT DOCUMENTS

GB 0420977.1 3/2003

(Continued)

*Primary Examiner* — Gary Jackson
*Assistant Examiner* — Erin Colello
(74) *Attorney, Agent, or Firm* — Luedeka Neely Group, PC

(57) ABSTRACT

A secondary instrument (11) insertable into a channel (12) in a main instrument (1) in a medical simulator. The secondary instrument comprises an outer sleeve (15) and a handle (17) movable within the outer sleeve. The instrument has a first configuration representing a first real instrument in which the handle is movable with respect to the outer sleeve for a first length of travel and a second configuration representing a second instrument in which the handle is movable with respect to the outer sleeve for a second length of travel which is less than the first length of travel. The instrument is therefore able to physically represent more than one real instrument.

5 Claims, 4 Drawing Sheets

U.S. PATENT DOCUMENTS

| | | | |
|---|---|---|---|
| 2005/0069854 A1* | 3/2005 | Maier | 434/262 |
| 2005/0131506 A1* | 6/2005 | Rezai et al. | 607/117 |
| 2005/0219205 A1* | 10/2005 | Bailey et al. | 345/156 |
| 2005/0256525 A1* | 11/2005 | Culbert et al. | 606/53 |
| 2006/0046235 A1* | 3/2006 | Alexander et al. | 434/262 |

FOREIGN PATENT DOCUMENTS

| | | |
|---|---|---|
| WO | WO 9719440 A1 * | 5/1997 |
| WO | WO 9939317 A1 * | 8/1999 |
| WO | WO 01/88881 A3 | 11/2001 |
| WO | WO0188881 A2 * | 11/2001 |

* cited by examiner

INSTRUMENT FOR USE IN A MEDICAL SIMULATOR

The present invention relates to an instrument for use in a medical simulator. More specifically, the invention relates to a medical instrument for use in an endoscopy simulator. However, the principles involved are readily applicable to other medical simulators for catheters and the like.

An endoscopy simulator comprises a dummy endoscope which is inserted into a simulation device. This device has sensors to detect longitudinal and rotational movement of the dummy instrument, and to apply force feedback to the instrument based on the detected position in relation to a software model of a colon. The software model also provides the operator with a simulated display of the inside of the colon as it would be seen through a real endoscope based on the detected position. An endoscope handle has a pair of control knobs which, in a real endoscope, can move the tip of the endoscope in left/right and up/down directions respectively in a process known as angulation. In a simulator, the position of these knobs is detected and, as this affects the position of the end of the endoscope, this is also taken into consideration by the simulation.

In a real endoscope, additional instruments, such as forceps or snares are inserted into the endoscope handle and passed along a length of the insertion tube where they emerge from the distal end of the endoscope. These secondary instruments are then seen by the user on a screen displaying the image from the endoscope to allow the user to carry out the necessary operation with the instrument.

The present invention is directed to the simulation of a secondary instrument in a simulator.

According to the present invention there is provided a secondary instrument insertable into a channel in a main instrument in a medical simulator, the secondary instrument comprising an outer sleeve, a handle being movable with respect to the outer sleeve; the instrument having a first configuration representing a first real instrument in which the handle is movable with respect to the outer sleeve for a first length of travel and a second configuration representing a second instrument in which the handle is movable in respect of the outer sleeve for a second length of travel which is less than the first length of travel.

This aspect of the invention effectively provides a universal secondary instrument which can simulate one of a number of real instruments. For example, for a snare, the length of travel between the two parts of the handle is typically 100 mm to allow for opening and closing of the snare, while for a biopsy sampling device, the length of travel required to open and close the jaws is typically 15 mm. Of course, with a dummy instrument, there is no need to provide a real tool at the distal end of the device such that the only difference which is apparent to the user in the simulated instrument is the length of travel between the two parts of the handle.

When the secondary instrument is used in a medical simulator, the user will input into the simulator the nature of the secondary instrument being employed and this will be graphically represented accordingly.

The different configurations may be achieved in numerous ways. The mechanism which can be used may be electromagnetic, pneumatic or electronic. However, preferably, a stop mechanism is deployable between the handle and outer sleeve to limit the length of travel between the handle and sleeve without increasing the force on the handle. The stop mechanism is preferably a protrusion insertable into a groove which defines the second length of travel. This provides a simple mechanism for switching between the configurations.

The secondary instrument may be in communication with the medical simulator such that the stop is automatically deployed in response to the user inputting a certain type of instrument.

However, more preferably, the stop is separately deployed by the user as they select a certain type of instrument for use in the simulation. When an instrument is selected, the controller may display a prompt to the user reminding them to deploy or retract the stop. The simulator may then detect the position of the stop and determine whether or not the instructions have been carried out before allowing the user to proceed.

However, the current preference is to provide a very simple manually deployable stop which is simply deployed by the user and which is not detected.

Optionally, the secondary instrument has at least one further configuration, the or each further configuration representing a further real instrument having a different length of travel to the first and second lengths of travel. The instrument is therefore able to simulate a number of different real instruments.

Examples of a secondary tool in accordance with the present invention and its associated medical simulator will now be described with reference to the accompanying drawings, in which.

Figure 1:
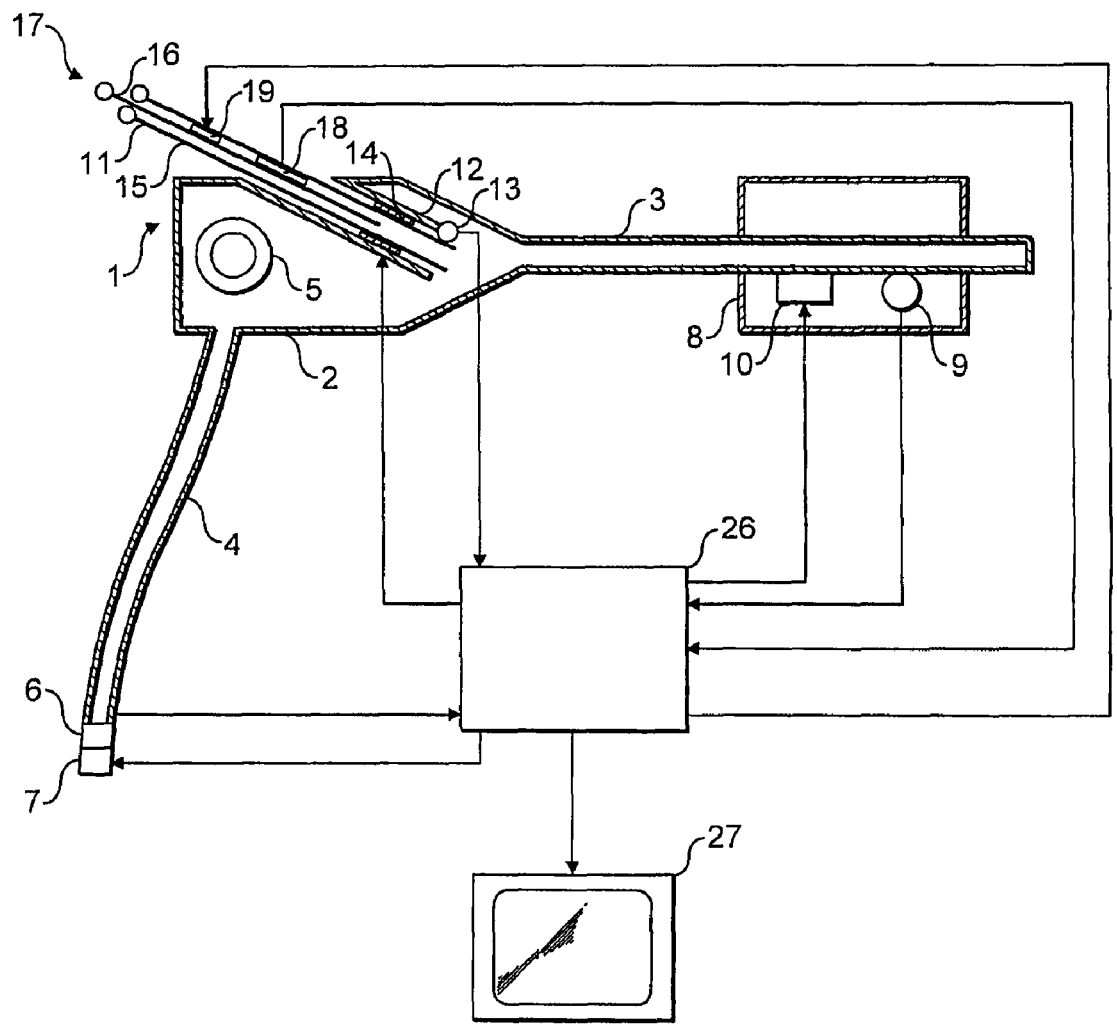
FIG. 1 is a schematic view of the overall medical simulator.

FIG. 1 is a schematic view of the overall simulator. The simulator comprises a dummy endoscope 1 which is based on a real endoscope modified to the minimum extent necessary to make it suitable for use in the simulator. The instrument has a handle 2, insertion tube 3 and an umbilical 4. In the real instrument the insertion tube 3 is inserted into the patient, while the umbilical is provided to transmit data, light, air and water to and from the insertion tube.

Movement, known as angulation, of the tip of the endoscope is effected by a pair of knobs 5. In a real instrument wires extend from these knobs to the distal end of the insertion tube so that the movement of the knobs is transmitted to the tip of the endoscope. One knob provides up/down movement and the other provides left/right movement. In the dummy endoscope 1 the cables are rerouted down the umbilical and their movement is detected by sensors 6 and force feedback to the knobs 5 is provided by force feedback motors 7.

The insertion tube 3 is inserted into a force feedback unit 8 provided with sensors 9 to sense the linear and rotational position of the endoscope while force feedback is provided by force feedback unit 10 which provides independent linear and rotational force feedback.

A secondary instrument 11 is inserted into a channel 12 in the endoscope handle and passes virtually to the end of insertion tube 3. The degree of insertion is sensed by a sensor 13 and force feedback is provided for example by a pneumatic sleeve 14. The secondary instrument 11 comprises an outer sleeve 15 and handle 17 which is relatively movable with respect to the sleeve 15. In a real instrument, the handle 17 would be connected to a cable and there would be a tool at the distal end of the cable. Upon insertion to the required degree into the insertion tube, the tool would then project from the distal end of the insertion tube 3. Movement of the handle 17 is sensed by a linear potentiometer 18 and force feedback is provided by a frictional brake 19 as shown in greater detail in FIG. 2.

As shown the frictional brake 19 is positioned adjacent to the handle 17. A solenoid 20 is provided to activate the break. The solenoid is connected to the brake via a linkage 21. A first return spring 22 is connected between the solenoid and the outer sleeve 15 to return the linkage when power to the solenoid is cut, while a second return spring (not shown) is provided between pins on the frictional brake 19 and linkage 21 to pull the brake away from the handle 17 as the linkage moves. Other devices, such as a pneumatic plunger may be provided in place of the solenoid.

Figure 2:
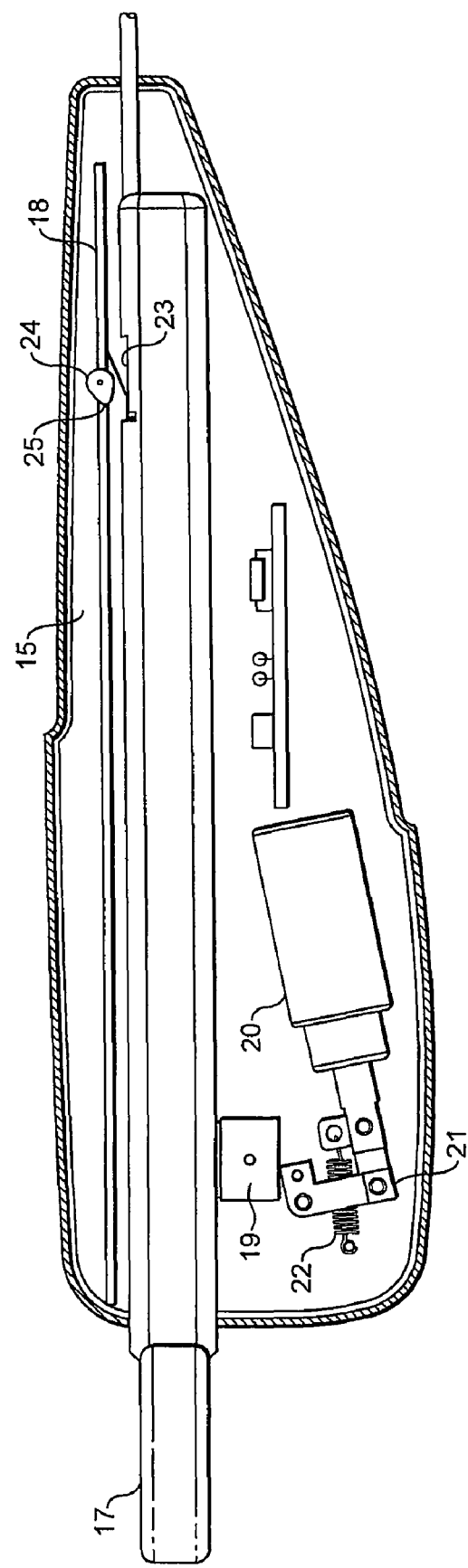
FIG. 2 is a plan view of the inside of the secondary instrument.
Figure 3:
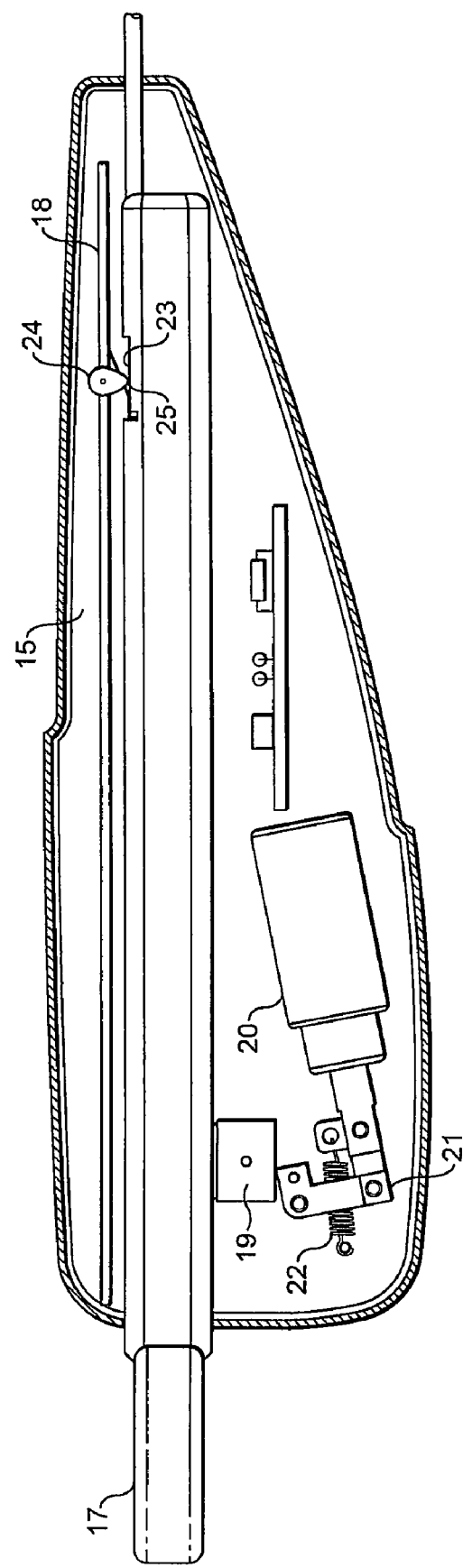
FIGS. 3 and 4 are plan views showing first and second configurations of the secondary instrument.
Figure 4:
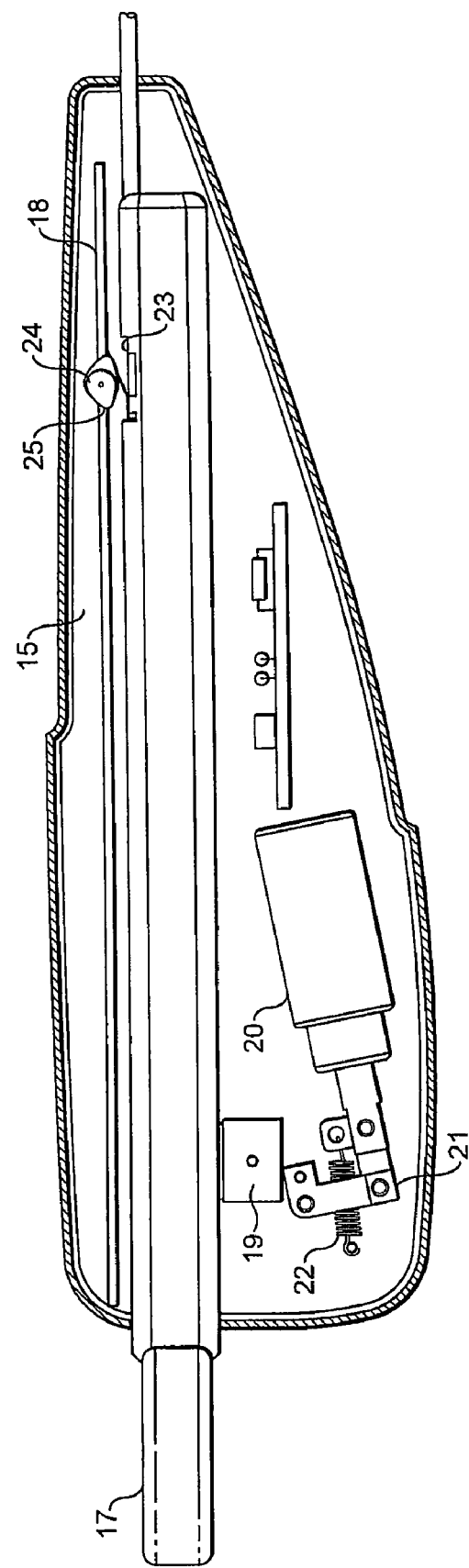

As can also be seen in FIG. 2, the handle 17 is provided with a recess 23. Shown schematically in FIG. 2 is the mechanism 24 for engaging with the recess. This mechanism is essentially a rotary knob which extends out of the housing of a secondary instrument so that it can be activated externally by a user. The mechanism has a cam lobe 25 which can be selectively deployed into the recess 23. As shown in FIG. 2, the cam lobe 25 is free of the recess 23, such that the movement of the handle 17 is unrestricted by the mechanism 24. This allows the secondary instrument to operate as a snare in which the handle 17 can move with respect to the housing by around 100 mm. When the cam lobe 25 is deployed into the recess 23, the length of travel of the handle is limited to the length of the recess 23. In this configuration, the secondary instrument can operate as a biopsy sampling device where the handle 17 can move typically 15 mm. A marking on the exterior of the housing will enable a user to determine the position of the mechanism 24 and hence the secondary instrument which is being simulated.

The example shown in FIG. 2 is capable of simulating two different secondary instruments. However, three or more instruments can readily be simulated. To simulate a further instrument, for example, the mechanism 24, could be provided with a second cam lobe projecting further than the cam lobe 25, and the handle 17 could be provided with a second recess deeper than the first recess 23. Thus, to simulate the third instrument the mechanism 24 can be rotated such that the second lobe locates in the deeper recess such that the travel of the handle 17 is limited to the length of the deeper recess. There are many other ways in which this could be carried out. For example, an entirely different cam and groove could be provided either spaced further along the handle 17 or on a different side of the handle 17. The mechanism need not comprise a rotatable cam. Instead it could be a linearly deployable component. Also, the mechanism could be inverted such that the deployable component is on the handle 17 and the groove is provided in the sleeve 15.

All of the signals from the various sensors are transmitted to a controller 26 which controls the simulation. The controller stores a software model of the colon and, together with the information from the sensors, this is used to generate the required levels of force feedback to the various force feedback devices. Also, the controller 26 determines from the calculated position of the insertion tube 3 and control knobs 5 the image which would be seen by the endoscope and displays this on screen 27. If the sensor 13 detects that the secondary instrument 11 has been inserted to a sufficient degree that it would emerge from the distal end of the insertion tube 3, the tool at the end of the secondary instrument would also be displayed on screen 27. The actual condition of the tool will be determined by the relative position of the handle 17 within the sleeve 15 as measured by linear potentiometer 18, and this is incorporated into the displayed image.

The invention claimed is:

1. An endoscope simulator, comprising a force feedback unit; a dummy endoscope including a dummy endoscope handle having a channel and an insertion tube insertable into the force feedback unit; and a secondary instrument insertable into the channel of the dummy endoscope handle, the secondary instrument comprising: an outer sleeve, a secondary instrument handle being movable with respect to the outer sleeve, and a stop mechanism deployable between the secondary instrument handle and the outer sleeve to limit the length of travel between the secondary instrument handle and outer sleeve without increasing the force between them; the secondary instrument having no tool at a distal end thereof and a first configuration representing a first real instrument corresponding to an instrument from the group consisting of forceps, a snare, or a biopsy sampling device, in which the secondary instrument handle is movable with respect to the outer sleeve for a first length of travel and a second configuration representing a second real instrument different from the first real instrument and to corresponding a different instrument from the group consisting of forceps, a snare, or a biopsy sampling device, in which the secondary instrument handle is movable in respect of the outer sleeve for a second length of travel which is less than the first length of travel, the stop mechanism being operable to switch between the first and second configurations representing the two different instruments.

2. The endoscope simulator according to claim 1, wherein the stop mechanism is a protrusion insertable into a groove which defines the second length of travel.

3. The endoscope simulator according to claim 1, wherein the stop mechanism is arranged to be manually deployed by a user.

4. The endoscope simulator according claim 1, further comprising a third-configuration representing a third real instrument different from the represented first and second real instruments, the secondary instrument handle being movable in respect of the outer sleeve for a third length of travel which is different from the first and second lengths of travel.

5. A secondary instrument insertable into a medical simulator, the secondary instrument comprising: an outer sleeve, a handle being movable with respect to the outer sleeve, and a stop mechanism deployable between the handle and the outer sleeve to limit the length of travel between the handle and outer sleeve without increasing the force between them; the secondary instrument having no tool at a distal end thereof and a first configuration representing a first real instrument in which the handle is movable with respect to the outer sleeve for a first length of travel and a second configuration representing a second real instrument in which the handle is movable in respect of the outer sleeve for a second length of travel which is less than the first length of travel, the stop mechanism being operable to switch between the first and second configurations representing the two different instruments.

* * * * *